(12) United States Patent
Masumoto

(10) Patent No.: US 9,708,846 B2
(45) Date of Patent: Jul. 18, 2017

(54) VEHICLE SEALING MEMBER

(71) Applicant: Nishikawa Rubber Co., Ltd., Hiroshima (JP)

(72) Inventor: Atsuo Masumoto, Hiroshima (JP)

(73) Assignee: Nishikawa Rubber Co., Ltd., Hiroshima (JP)

(*) Notice: Subject to any disclaimer, the term of this patent is extended or adjusted under 35 U.S.C. 154(b) by 0 days.

(21) Appl. No.: 15/152,079

(22) Filed: May 11, 2016

(65) Prior Publication Data

US 2016/0340969 A1 Nov. 24, 2016

(30) Foreign Application Priority Data

May 19, 2015 (JP) .................. 2015-102035

(51) Int. Cl.
| | |
|---|---|
| *E06B 7/23* | (2006.01) |
| *B60J 10/08* | (2006.01) |
| *B60J 10/21* | (2016.01) |
| *B60J 10/246* | (2016.01) |
| *B60J 10/248* | (2016.01) |
| *B60J 10/84* | (2016.01) |
| *B60J 10/27* | (2016.01) |
| *B60J 10/80* | (2016.01) |

(52) U.S. Cl.
CPC ............ *E06B 7/2303* (2013.01); *B60J 10/21* (2016.02); *B60J 10/246* (2016.02); *B60J 10/248* (2016.02); *B60J 10/27* (2016.02); *B60J 10/80* (2016.02); *B60J 10/84* (2016.02); *E06B 7/2314* (2013.01)

(58) Field of Classification Search
CPC ......... E06B 7/2303; B60J 10/21; B60J 10/22; B60J 10/24; B60J 10/27; B60J 10/80; B60J 10/84; B29C 45/14409
See application file for complete search history.

(56) References Cited

U.S. PATENT DOCUMENTS

| | | | | |
|---|---|---|---|---|
| 5,258,157 A * | 11/1993 | Nozaki | ............... | B29C 33/0044 264/261 |
| 5,972,268 A * | 10/1999 | Nakajima | ......... | B29C 45/14409 264/138 |
| 5,976,438 A * | 11/1999 | Hamabata | ......... | B29C 45/14409 264/138 |
| 6,012,760 A * | 1/2000 | Nozaki | ............. | B29C 45/14409 296/146.9 |
| 7,178,809 B2 * | 2/2007 | Kuzuya | .................... | B60J 10/90 277/631 |
| 7,306,839 B2 * | 12/2007 | Kubo | ................. | B29C 45/14409 428/122 |
| 7,582,243 B2 * | 9/2009 | Kubo | ................ | B29C 45/14409 264/250 |
| 7,740,466 B2 * | 6/2010 | Kubo | .................. | B29C 33/3828 264/259 |

(Continued)

FOREIGN PATENT DOCUMENTS

JP          3365006 B2      1/2003

*Primary Examiner* — Justin Rephann
(74) *Attorney, Agent, or Firm* — Alston & Bird LLP

(57) ABSTRACT

An extruded portion 2 is provided with a bridge. A molded portion 3 has a slit 7 through which the core of a mold for molding the inner surface of a hollow seal part 4. An edge of the slit 7 has unevenness. In sealing, a protruding portion 16 of the uneven edge comes into contact with the inner surface of the hollow seal part 4.

5 Claims, 7 Drawing Sheets

(56) References Cited

U.S. PATENT DOCUMENTS

| | | | | |
|---|---|---|---|---|
| 2001/0034977 | A1* | 11/2001 | Hattori | B60J 10/24 49/479.1 |
| 2002/0001696 | A1* | 1/2002 | Kozawa | B29C 45/14409 428/156 |
| 2002/0058124 | A1* | 5/2002 | Nakajima | B29C 45/14409 428/99 |
| 2002/0178656 | A1* | 12/2002 | Nozaki | B29C 45/14409 49/441 |
| 2003/0157298 | A1* | 8/2003 | Kubo | B60J 10/21 428/122 |
| 2004/0216384 | A1* | 11/2004 | Teramoto | B60J 10/24 49/479.1 |
| 2004/0247827 | A1* | 12/2004 | Kubo | B29C 45/0053 428/136 |
| 2004/0250474 | A1* | 12/2004 | Kubo | B29C 45/0053 49/479.1 |
| 2005/0008819 | A1* | 1/2005 | Kubo | B29C 45/14409 428/122 |
| 2005/0279026 | A1* | 12/2005 | Tsuchida | B60J 10/79 49/495.1 |
| 2006/0073727 | A1* | 4/2006 | Kimura | B29C 45/14409 439/441 |
| 2014/0000174 | A1* | 1/2014 | Minagawa | B60J 10/86 49/483.1 |

* cited by examiner

REAR ←          → FRONT

FRONT ← → REAR

FRONT ← → REAR

VEHICLE SEALING MEMBER

CROSS-REFERENCE TO RELATED APPLICATIONS

This application claims priority to and the benefit of Japanese Patent Application No. 2015-102035, filed on May 19, 2015, the contents of which as are hereby incorporated by reference in their entirety.

BACKGROUND

The present disclosure relates to a vehicle sealing member for sealing the gap between a door of an automobile and an opening for the door, for example, and more particularly relates to the field of a structure having an extruded portion and a molded portion that are integrated together.

Such a weatherstrip as disclosed in Japanese Patent No. 3365006 is disposed between a door opening of an automobile and a door for opening and closing the door opening, for example. The weatherstrip of Japanese Patent No. 3365006 includes a basal part formed along the roof side of an automobile and attached to the roof side, and a seal part against which an edge of a door glass is pressed from outside the cabin. The basal part and the seal part form a hollow body. The weatherstrip of Japanese Patent No. 3365006 is formed to have an extruded portion and a molded corner portion that are continuously integrated together. A portion of the seal part corresponding to the molded portion has a protrusion, and a portion of the basal part corresponding to the molded portion has a protrusion facing the protrusion of the seal part with a slight gap therebetween.

BRIEF SUMMARY

A continuous portion of the weatherstrip of Japanese Patent No. 3365006 having the same longitudinal cross-sectional shape is extruded, and a portion thereof having a different cross-sectional shape is molded. In this manner, an integral weatherstrip can be formed. The extruded portion includes a bridge inside the hollow body, resulting in a predetermined sealing pressure ensured. On the other hand, the core of a mold die for molding the inner surface of the hollow body must be removed from the molded portion after molding. Thus, the molded portion cannot include a bridge similar to that of the extruded portion. To address this problem, portions of the seal part and basal part corresponding to the molded portion respectively have protrusions facing each other. This allows the molded portion with no bridge and the extruded portion with the bridge to apply sealing pressures close to each other.

In molding, the inner surface of the hollow body is formed using the core of the mold die as described above, and then the core must be removed from the hollow body. Thus, the hollow body needs to have a slit-shaped opening portion for removing the core therethrough.

However, the opening portion of the hollow body reduces the rigidity of the hollow body, resulting in lower sealing pressures. Thus, it is recommended that the width of the opening portion should be as small as possible. In Japanese Patent No. 3365006, the protrusions facing each other are provided with a slight gap therebetween. Thus, the width of the opening portion may be slight. If the width of the opening portion is slight, the thickness of a root portion of the core of the mold die must also be reduced to a thickness substantially equal to the width of the opening portion. As a result, the root portion of the core becomes thin. This causes the core to be insufficiently strong and to be less durable.

In view of the foregoing background, it is therefore an object of the present disclosure to improve the durability of a core for molding a molded portion with no bridge while allowing an extruded portion with a bridge and the molded portion to apply substantially the same sealing pressure.

In order to achieve the object, an edge of an opening portion of the molded portion of a vehicle sealing member according to an embodiment of the present disclosure has unevenness, and protruding portions of the uneven edge are brought into contact with the inner surface of a hollow seal part. This ensures that the molded portion and the extruded portion applies substantially the same sealing pressure. Recessed portions may increase the thickness of portions of a root portion of the core. This allows the core to be strong.

Specifically, a vehicle sealing member is disposed between a periphery of a door and a periphery of an associated door opening of a vehicle body, and includes: a hollow seal part configured to seal a gap between the door and the door opening if pressed by the door in a closed state and the vehicle body. The vehicle sealing member includes an extruded portion and a molded portion that are integrated together. A bridge is provided in the extruded portion to extend such that a plurality of points of an inner surface of the hollow seal part are connected together. The molded portion has an opening portion through which a core of a mold die for molding the inner surface of the hollow seal part is removed. An edge of the opening portion has unevenness. At least one protruding portion of the uneven edge comes into contact with the inner surface of the hollow seal part to seal the gap.

According to this configuration, to form the molded portion, the inner surface of the hollow seal part is molded with the core of the mold die, and the core may be removed through the opening portion of the hollow seal part after molding. The edge of this opening portion having the unevenness increases the thickness of a portion of the root portion of the core corresponding to the at least one recessed portion. This allows the core to be strong.

If the door is closed to press the hollow seal part, the protruding portion of the edge of the opening portion of the molded portion comes into contact with the inner surface of the hollow seal part. This allows the molded portion and the extruded portion to apply substantially the same sealing pressure.

Opening the door causes the at least one protruding portion to be apart from the inner surface of the hollow seal part, and closing the door causes the at least one protruding portion to come into contact with the inner surface of the hollow seal part. In this case, the unevenness reduces the area of contact between the sealing member and the inner surface of the hollow seal part. This makes it more difficult to make sticky sound from rubber or thermoplastic elastomer.

In one embodiment, the opening portion of the molded portion may be configured as a slit that extends in a longitudinal direction of the hollow seal part, and an edge of the slit may have the unevenness that continues in a longitudinal direction of the slit.

According to this configuration, the opening portion of the molded portion is a slit extending in the longitudinal direction of the hollow seal part. Thus, after molding, the core may be easily removed through the slit. The unevenness continues in the longitudinal direction of the slit. This allows a wide area of the root portion of the core to be thick, thereby obtaining a strong core.

In another embodiment, at least one recessed portion of the uneven edge may be set to be wider than the at least one protruding portion.

Increasing the width of the at least one recessed portion allows the root portion of the core to be stronger.

In still another embodiment, a contact surface corresponding to a portion of the inner surface of the hollow seal part coming into contact with the at least one protruding portion may be configured as a flat surface extending in a direction in which the unevenness continues.

According to this configuration, forming a flat contact surface may ensure that when the sealing member is deformed, the at least one protruding portion comes into contact with the contact surface. Thus, a predetermined sealing pressure may be reliably provided.

In yet another embodiment, the unevenness may continue from the edge of the opening portion toward an inside of the hollow seal part.

According to this configuration, the unevenness is provided in a wide area. This may ensure that when the sealing member is deformed, the at least one protruding portion comes into contact with the contact surface. Thus, a predetermined sealing pressure may be reliably provided.

According to an aspect of the present disclosure, a molded portion has an opening portion through which the core of a mold die for molding the inner surface of a hollow seal part is removed, and an edge of the opening portion has unevenness, and has at least one protruding portion coming into contact with the inner surface of the hollow seal part. This allows an extruded portion with a bridge and the molded portion with no bridge to apply substantially the same sealing pressure, and may simultaneously increase the durability of the core for molding the molded portion.

BRIEF DESCRIPTION OF THE SEVERAL VIEWS OF THE DRAWING(S)

Figure 6:
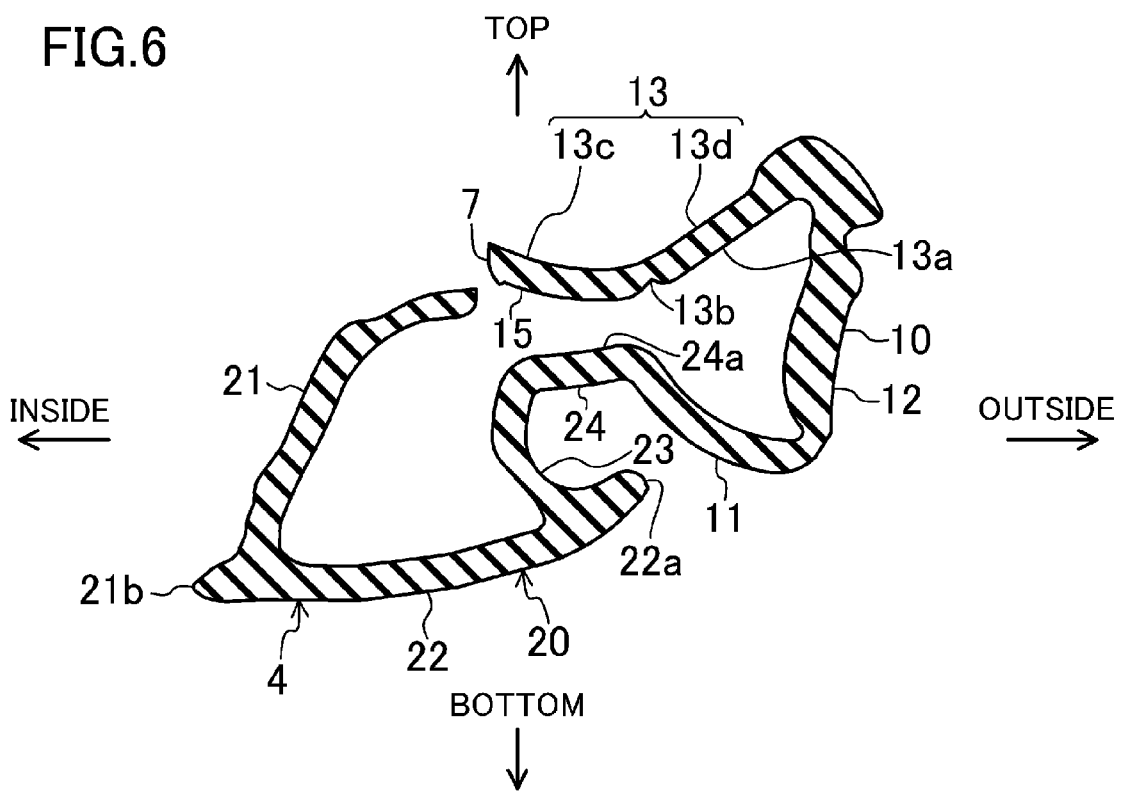
FIG. 6 is a cross-sectional view taken along the plane VI-VI shown in FIG. 5.
Figure 8:
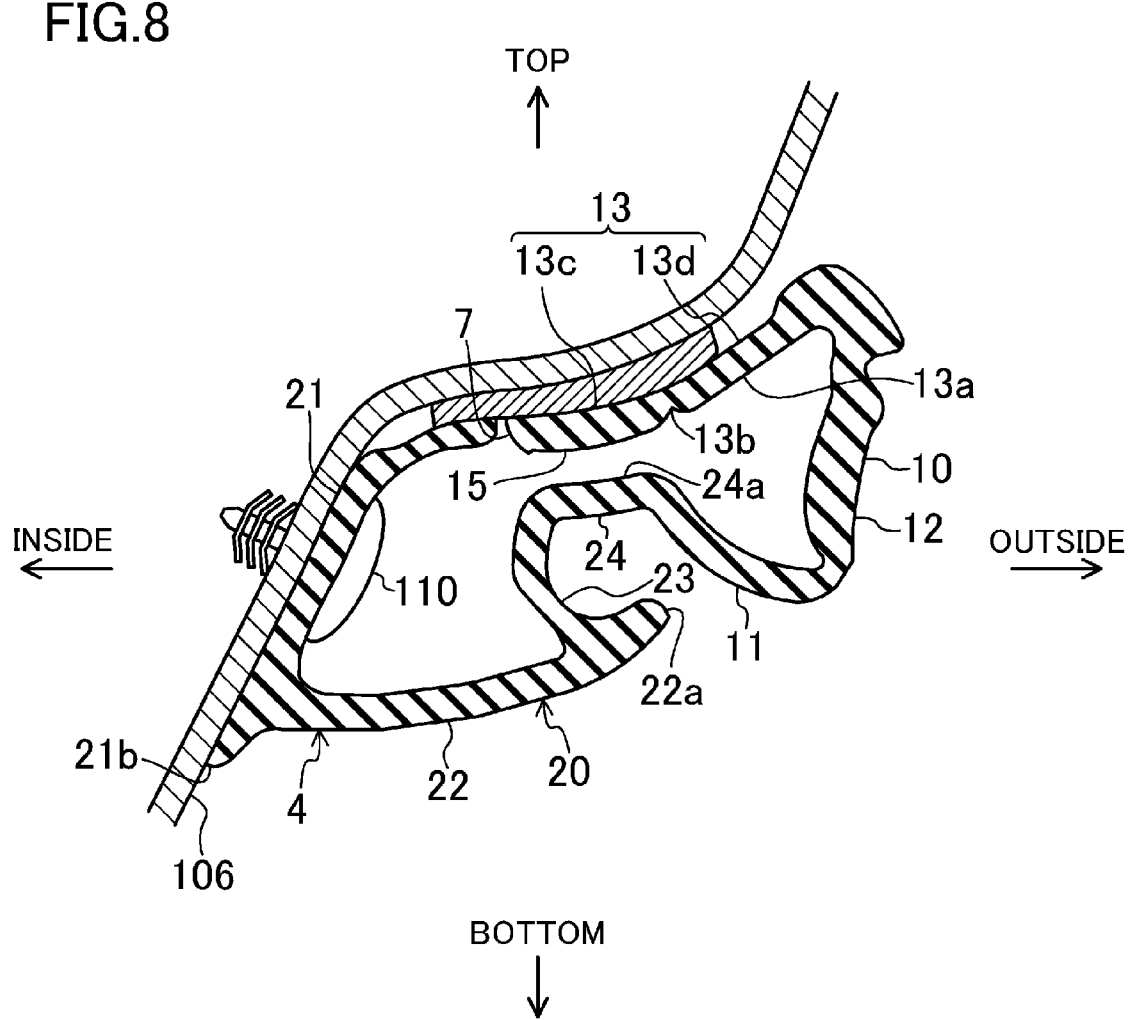

FIG. 8 corresponds to FIG. 6, and illustrates the vehicle sealing member in use.

Figure 7:
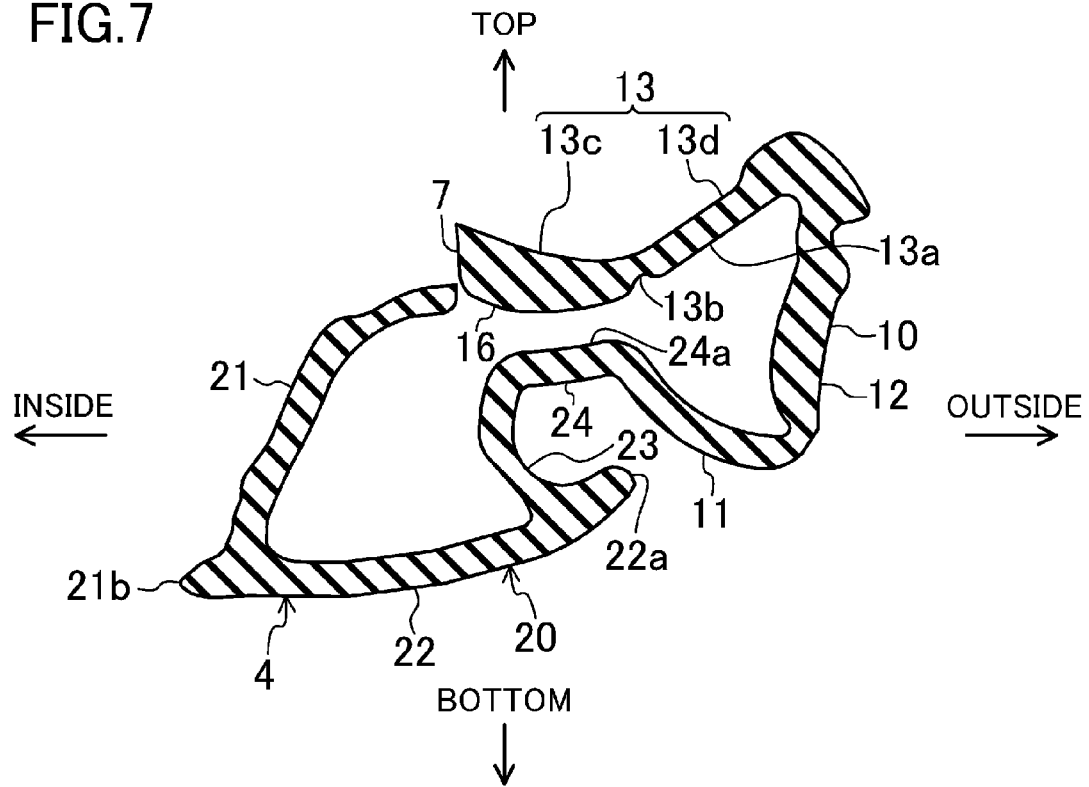
FIG. 7 is a cross-sectional view taken along the plane VII-VII shown in FIG. 5.
Figure 9:
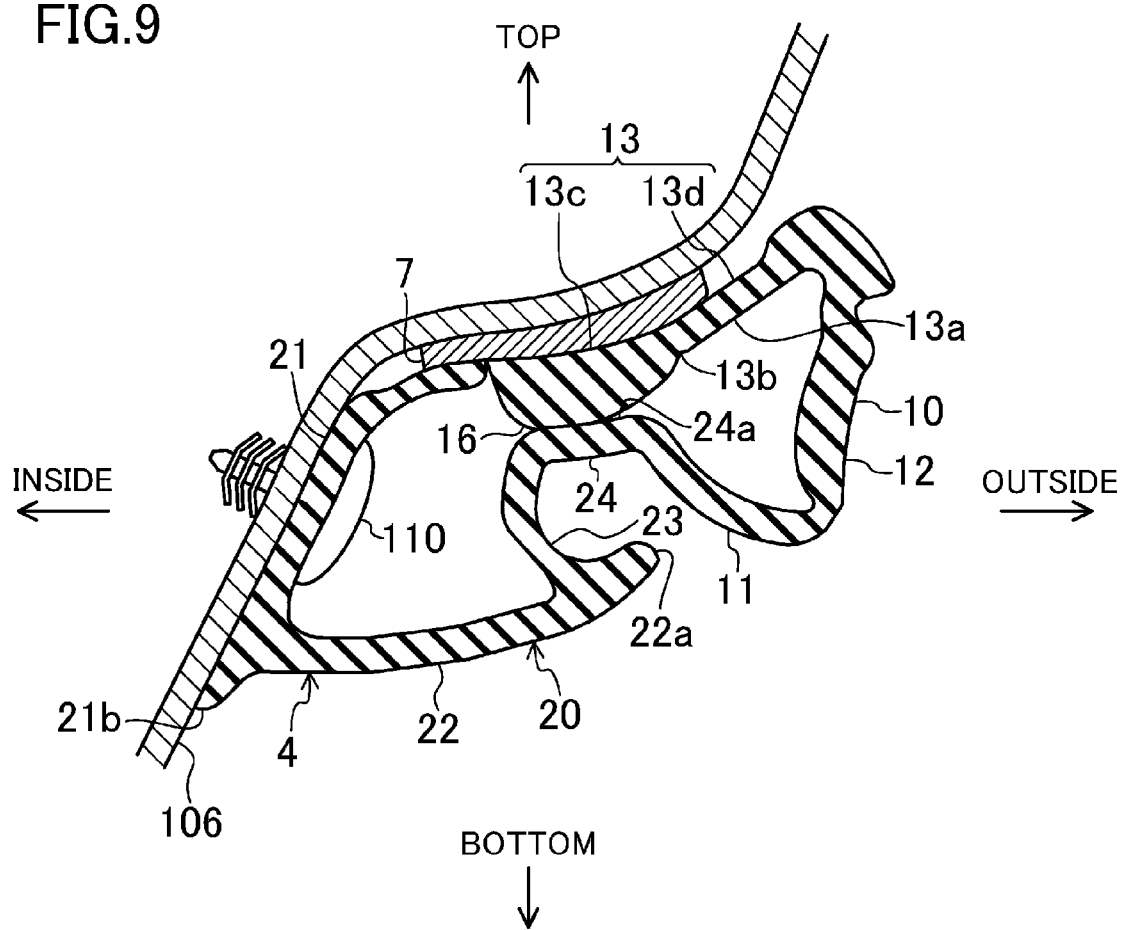

FIG. 9 corresponds to FIG. 7, and illustrates the vehicle sealing member in use.

Figure 10:
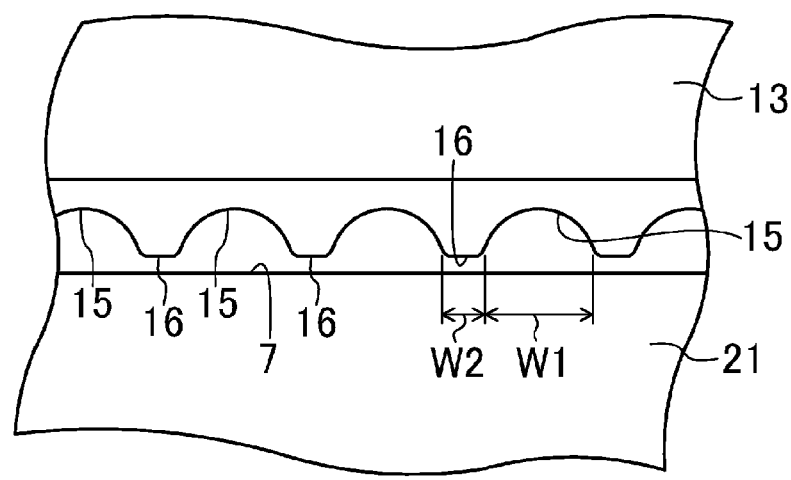

FIG. 10 is an enlarged view of a portion of the vehicle sealing member having unevenness in the vicinity of a slit.

DETAILED DESCRIPTION OF VARIOUS EMBODIMENTS

An embodiment of the present disclosure will now be described with reference to the drawings. The following preferred embodiment is merely illustrative in nature, and is not intended to limit the scope, applications, or use of the invention.

Figure 1:
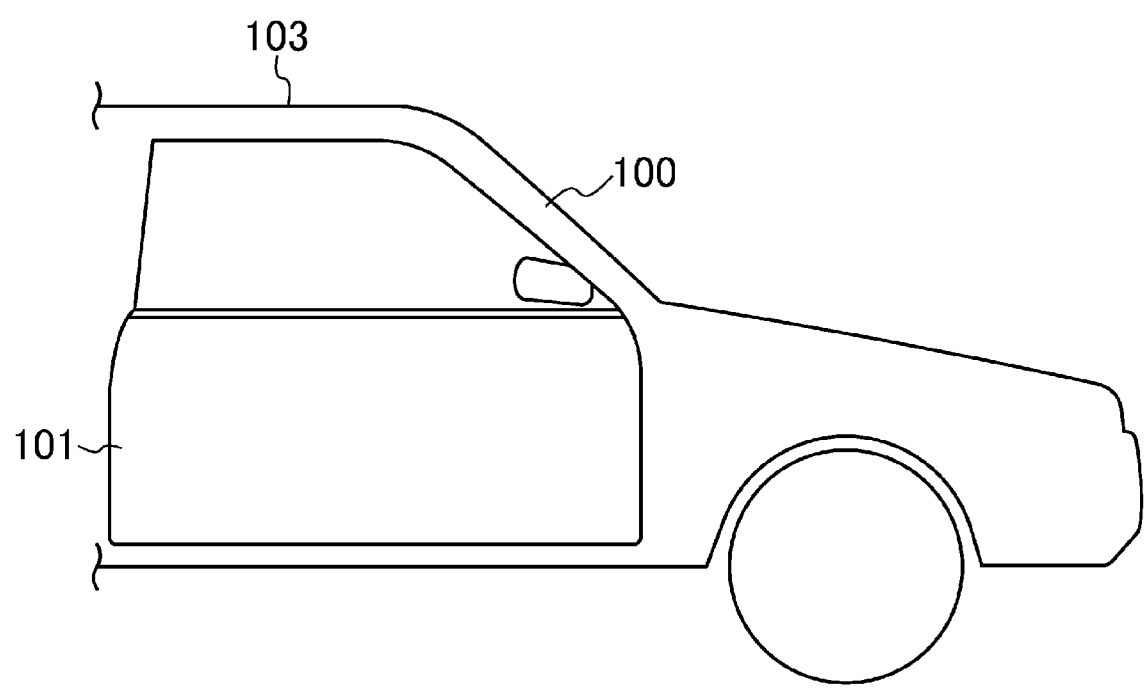
FIG. 1 is a right side view of a front portion of a vehicle including a vehicle sealing member according to an embodiment.

FIG. 1 illustrates a front portion of a vehicle to which a vehicle sealing member 1 according to an embodiment of the present disclosure is attached as viewed from outside the cabin (the right side of the vehicle). This vehicle is a passenger automobile, and its sides each have a door opening 102 (shown in FIG. 2) that is openable and closable by a front door 101. A pillar 100 is disposed in front of the door opening 102 to extend in a top-to-bottom direction. A front end portion of the front door 101 is attached to a lower half portion of the pillar 100 via a hinge (not shown) so that the front door 101 is openable and closable. An upper half portion of the pillar 100 extends while being inclined rearward toward the upper end thereof. The upper end of the pillar 100 is continuous with the front end of a roof 103.

In the description of this embodiment, the front side of the vehicle is simply referred to as "front," and the rear side of the vehicle is simply referred to as "rear." In the following description, the case in which the present disclosure is applied to a so-called hardtop vehicle including an unretractable roof 103, and doors themselves each having an upper half portion that does not include a sash or a retainer for housing an edge of an associated door glass will be described, but the present disclosure may also be applied to a convertible vehicle including a retractable roof, for example. The type of the vehicle as used herein is merely an example of the present disclosure.

The sealing member 1 is disposed between the periphery of the front door 101 and the periphery of the door opening 102 of the vehicle body to seal the gap between the front door 101 and the door opening 102, and is entirely molded of an elastic material, such as rubber. Examples of the elastic material include rubber such as ethylene-propylene-diene rubber (EPDM), and thermoplastic elastomer (TPE). The sealing member 1 of this embodiment is attached to the front pillar 100. However, if the shape of the sealing member 1 is changed, the sealing member 1 may be attached to the roof 103, a rear pillar, or a center pillar, for example. The reference numeral 104 shown in FIG. 2 denotes a portion of a pillar trim covering a surface of the pillar 100 inside the cabin.

Figure 2:
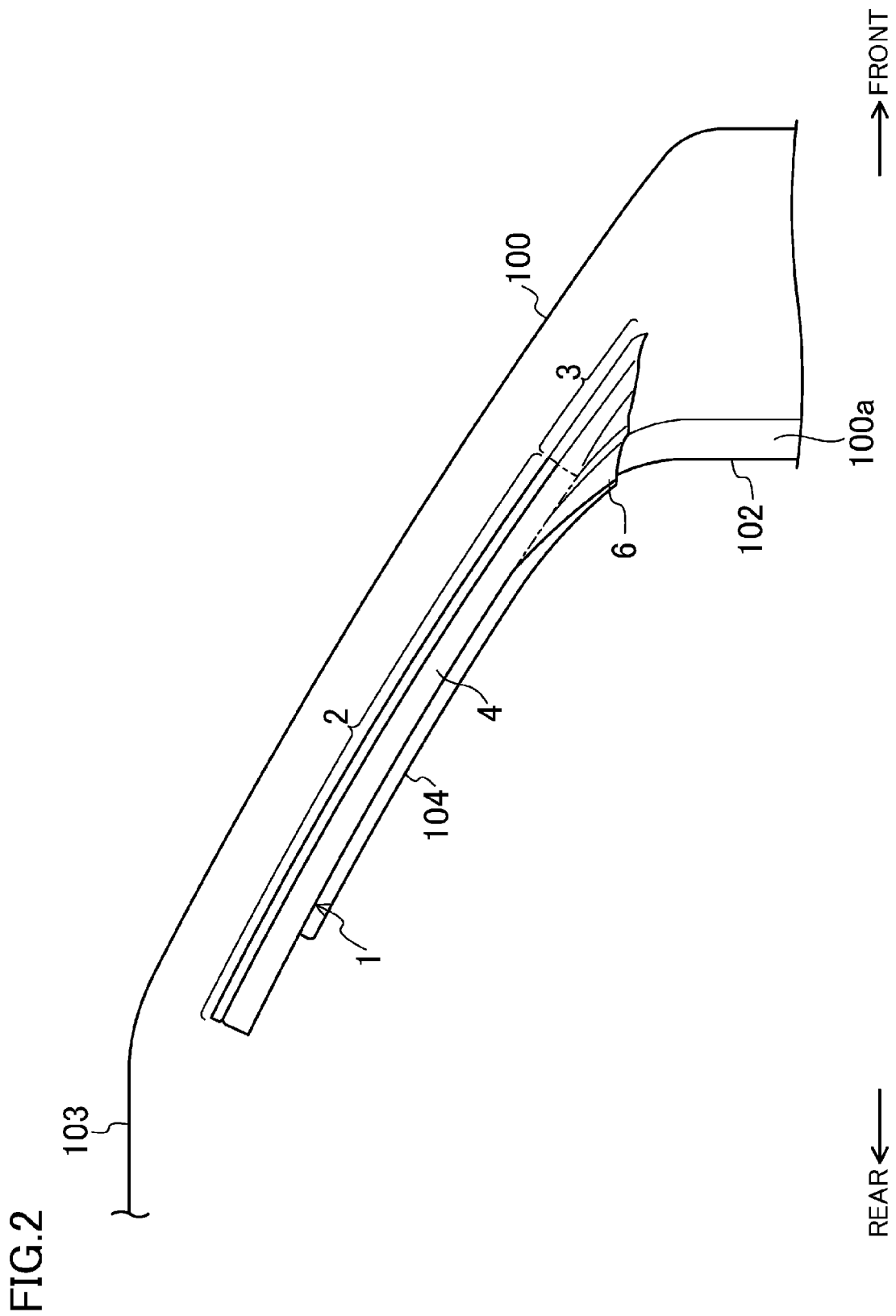
FIG. 2 is a right side view illustrating how the vehicle sealing member according to the embodiment is attached to a pillar of the vehicle.
Figure 3:
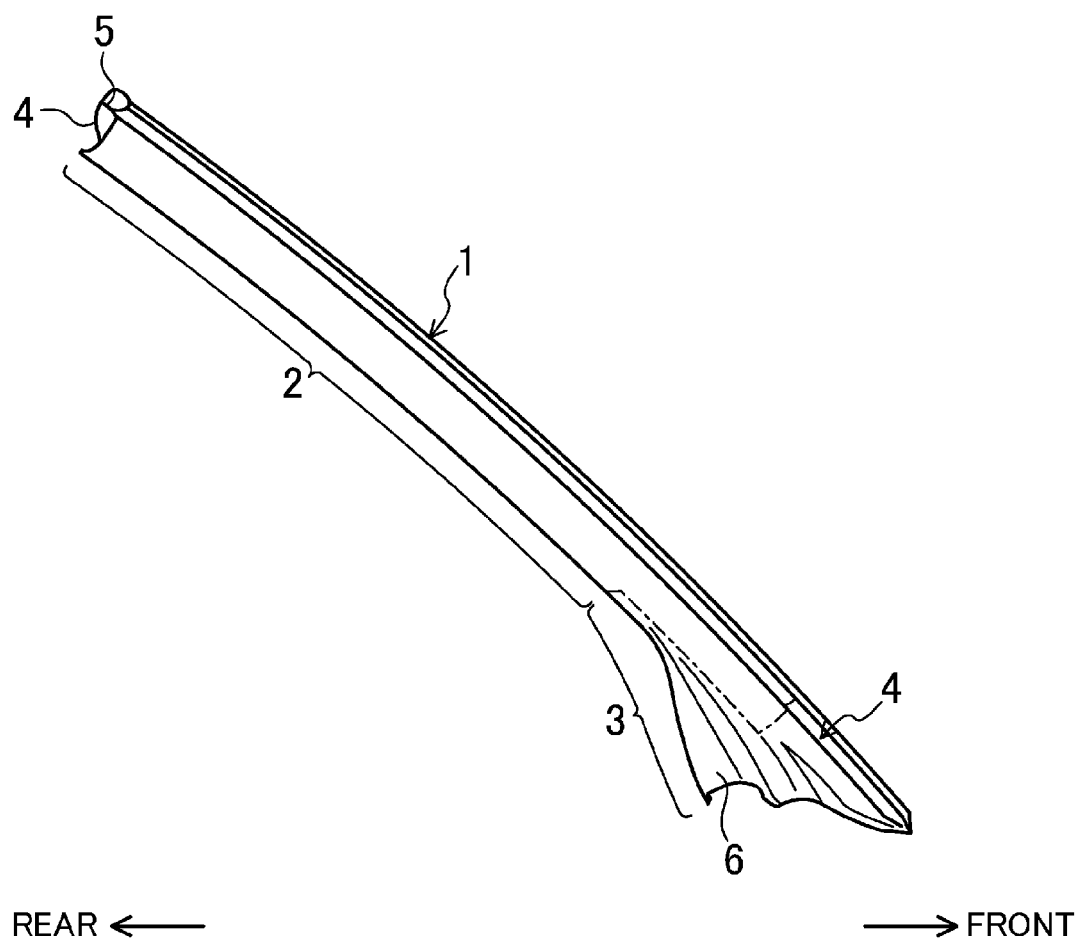
FIG. 3 is a perspective view of the vehicle sealing member as viewed from outside the cabin.

The sealing member 1 extends along the pillar 100 from the vicinity of the upper end of the pillar 100 to the vicinity of the lower end thereof to form an elongated shape. The sealing member 1 has two portions formed by different forming processes. Specifically, as illustrated in FIGS. 2 and 3, a portion of the sealing member 1 from the upper end thereof to a point of a vertically intermediate portion thereof closer to the lower end is an extruded portion 2, and a portion of the sealing member 1 below the extruded portion 2 is a molded portion 3. The boundary between the extruded portion 2 and the molded portion 3 is indicated by the dot-and-dash line in each of FIGS. 2-4, and appears on the surface of the sealing member 1 in the form of a slender line if the sealing member 1 is commercially available.

The extruded portion 2 extends more downwardly at the front side of the sealing member 1 than at the rear side. In an extrusion process, a material is extruded through an extrusion die (not shown) to form an object in which the same cross-sectional shape is longitudinally continuous. In a molding process, the cavity inside a mold die is filled with a material to form an object with the molding surface of the mold die. These two forming processes have been well known, and have been disclosed in, for example, Japanese Patent No. 3365006. Thus, detailed description of these processes will be omitted.

Figure 4:
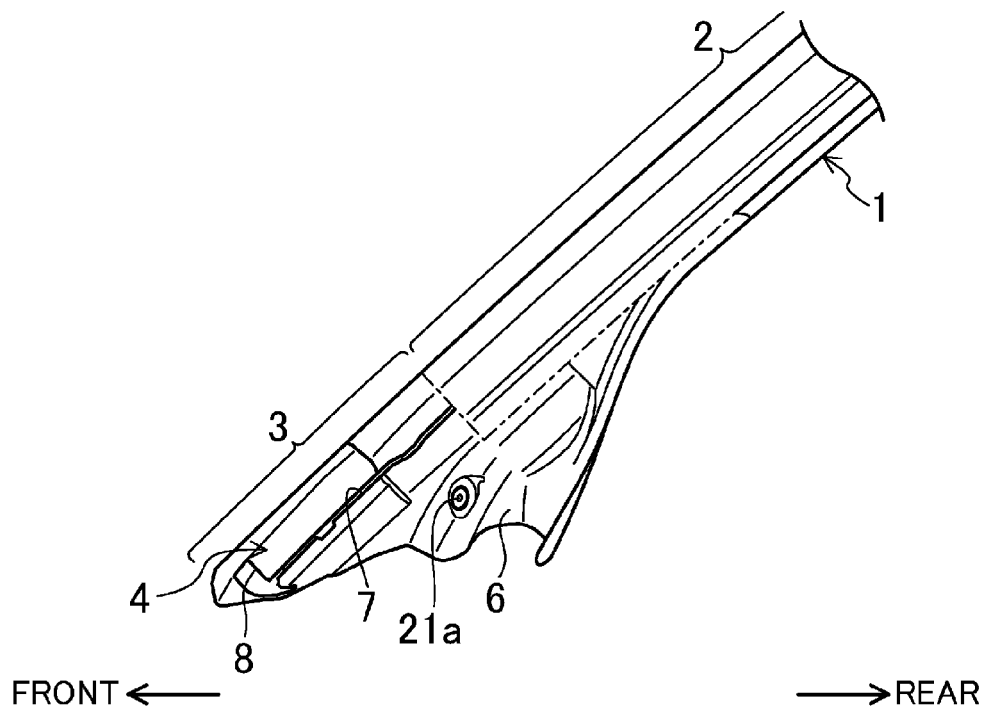
FIG. 4 is a perspective view of a substantially lower half portion of the vehicle sealing member as viewed from inside the cabin.

As illustrated in FIGS. 3 and 4, the extruded portion 2 of the sealing member 1 has the same cross-sectional shape from its upper end to its lower end as described above. On the other hand, the front-to-rear dimension of the molded portion 3 of the sealing member 1 gradually increases downward, and the molded portion 3 has a complicated shape.

The sealing member 1 includes a hollow seal part 4 including the extruded portion 2 and the molded portion 3 that are continuous. The hollow seal part 4 is pressed by the front door 101 in a closed state (including glass) and the vehicle body to seal the gap between the front door 101 and the door opening 102. Although shown only in FIG. 3, a bridge 5 is provided inside a portion of the hollow seal part 4 corresponding to the extruded portion 2. The bridge 5 is provided only in the extruded portion 2, and is a wall extending in the lateral direction of the vehicle to connect two points of the inner surface of the hollow seal part 4 together. Thus, in the extruded portion 2, the interior of the hollow seal part 4 is sectioned into two sections by the bridge 5. The two hollow sections are formed with the bridge 5 interposed therebetween.

When the front door 101 is in a closed state, the bridge 5 is pressed by the front door 101 and the vehicle body, and thus becomes elastically deformed. A repulsive force exerted by this elastic deformation presses the hollow seal part 4 against the periphery of the front door 101 and the vehicle body. This allows the hollow seal part 4 to be in close contact with the periphery of the front door 101 and the vehicle body, thereby improving the sealing performance.

As illustrated in FIG. 4, while a front portion of the molded portion 3 forms part of the hollow seal part 4, a rear portion of the molded portion 3 forms a plate-like portion 6. The plate-like portion 6 extends along a flange 100a of the pillar 100 as illustrated in FIG. 2.

As illustrated in FIGS. 6 and 7, a portion of the hollow seal part 4 corresponding to the molded portion 3 includes an outer hollow portion 10 located outside the cabin, and an inner hollow portion 20 closer to the inside of the cabin than the outer hollow portion 10. The outer hollow portion 10 communicates with one of the two hollow sections closer to the outside of the cabin than the bridge 5 in the portion of the hollow seal part 4 corresponding to the extruded portion 2. The inner hollow portion 20 communicates with the other hollow section closer to the inside of the cabin than the bridge 5 in the portion of the hollow seal part 4 corresponding to the extruded portion 2.

Figure 5:
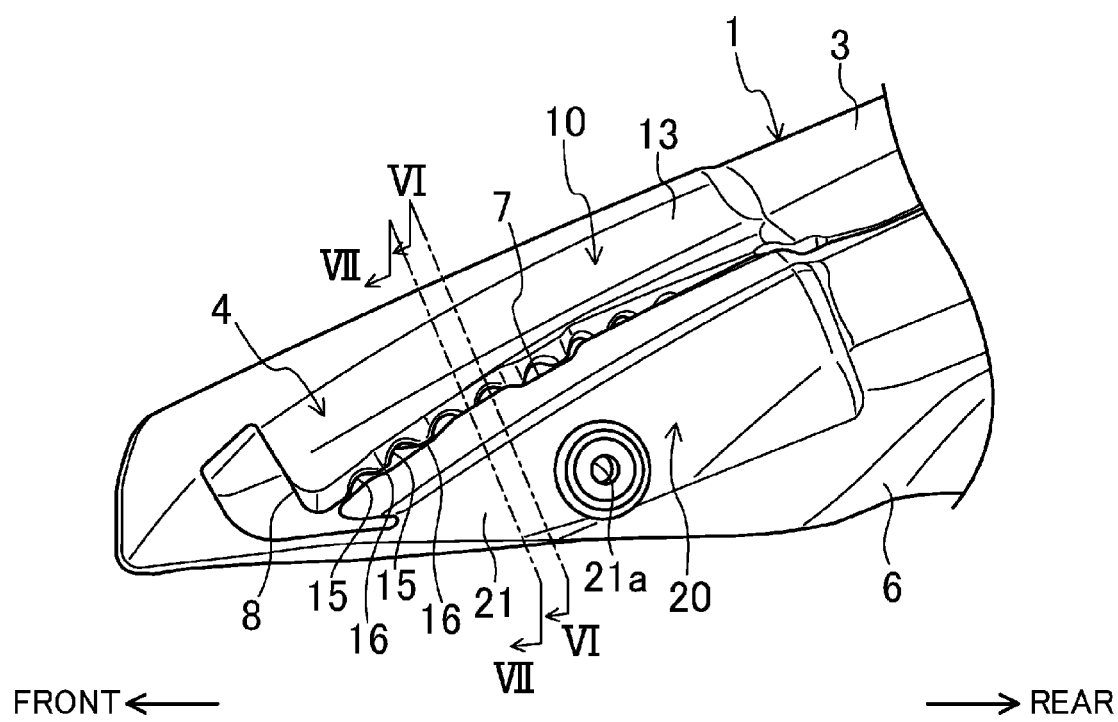
FIG. 5 is an enlarged perspective view of a molded portion of the vehicle sealing member as viewed from inside the cabin.

As illustrated in FIGS. 4 and 5, the lower end of the molded portion 3 has an opening 8 for opening the lower end of the hollow seal part 4 downwardly. The opening 8 extends from a surface of the molded portion 3 outside the cabin to a surface thereof inside the cabin.

The portion of the hollow seal part 4 corresponding to the molded portion 3 has a slit (opening portion) 7 through which the core (not shown) of a mold die for molding the inner surface of the hollow seal part 4 is removed. The slit 7 extends in the longitudinal direction of the hollow seal part 4, and is totally inclined downwardly toward the front. The lower end of the slit 7 is connected to the opening 8. As illustrated also in FIGS. 6 and 7, the slit 7 is located in the vicinity of a central portion of the hollow seal part 4 in the lateral direction of the vehicle. The outer hollow portion 10 is closer to the outside of the cabin than the slit 7, and the inner hollow portion 20 is closer to the inside of the cabin than the slit 7. As illustrated in FIG. 4, the extruded portion 2 does not have the slit 7, which thus extends to a vertically intermediate point of the sealing member 1.

As illustrated in FIGS. 6 and 7, a wall constituting the inner hollow portion 20 includes an inner stationary wall portion 21, a lower wall portion 22 extending from the lower edge of the stationary wall portion 21 toward the outside of the cabin, and a protruding wall portion 23 protruding upwardly from an edge of the lower wall portion 22 closer to the outside of the cabin. The stationary wall portion 21 is fixed to a vehicle body panel 106 (shown in FIGS. 8 and 9) partially forming the pillar 100. The stationary wall portion 21 has a fastener insertion hole 21a (shown in FIGS. 4 and 5) through which a fastener 110 shown in FIG. 8 is inserted. The fastener 110 is a member for fixing the molded portion 3 of the sealing member 1 to the pillar 100. The sealing member 1 may be bonded to the pillar 100 with a double-sided adhesive tape or any other suitable material.

A lower end portion of the stationary wall portion 21 has an inner protrusion 21b protruding toward the inside of the cabin and extending in the top-to-bottom direction. The inner protrusion 21b becomes elastically deformed so as to be brought into close contact with the vehicle body panel 106 by being pressed against the vehicle body panel 106 in a situation where the fastener 110 fastens the molded portion 3 to the pillar 100. An end portion of the lower wall portion 22 closer to the outside of the cabin has an outer protrusion 22a protruding toward the outside of the cabin and extending in the bottom-to-top direction.

The protruding wall portion 23 extends while being curved toward the inside of the cabin. The upper end of the protruding wall portion 23 is provided with an intermediate wall portion 24 extending toward the outside of the cabin. An inner surface 24a of the intermediate wall portion 24 is configured as a flat surface that extends in the inside-to-outside direction of the cabin.

A wall constituting the outer hollow portion 10 includes a lower wall portion 11 extending from an edge of the intermediate wall portion 24 closer to the outside of the cabin toward the outside of the cabin, a side wall portion 12 extending upwardly from an edge of the lower wall portion 11 closer to the outside of the cabin, and an upper wall portion 13 extending from the upper edge of the side wall portion 12 toward the inside of the cabin. The lower wall portion 11 extends while being inclined downwardly toward the outside of the cabin. The upper wall portion 13 extends while being inclined downwardly toward the inside of the cabin. The vertical distance between the upper and lower wall portions 13 and 11 decreases toward the inside of the cabin. An inner surface 13a of the upper wall portion 13 has a recess 13b at its intermediate point in the inside-to-outside direction of the cabin. The recess 13b extends in the top-to-bottom direction. A portion 13c of the upper wall portion 13 closer to the inside of the cabin than the recess 13b is inclined upwardly toward the inside of the cabin in a situation in which no external force is applied to the portion 13c immediately after molding. In other words, the upper wall portion 13 is bent so as to be recessed downwardly in the vicinity of the recess 13b. In addition, the formation of the recess 13b facilitates deforming the upper wall portion 13 from a point near the recess 13b.

The slit 7 is located between an edge of the stationary wall portion 21 of the inner hollow portion 20 closer to the outside of the cabin and an edge of the upper wall portion 13 of the outer hollow portion 10 closer to the inside of the cabin. Thus, both longitudinally extending edges of the slit 7 correspond to the edge of the stationary wall portion 21 of the inner hollow portion 20 closer to the outside of the cabin and the edge of the upper wall portion 13 of the outer hollow portion 10 closer to the inside of the cabin.

As illustrated in FIG. 5, the inner surface of one of the longitudinally extending edges of the slit 7 closer to the outside of the cabin has unevenness that continues in the longitudinal direction of the slit 7. The uneven inner surface includes recessed portions 15 and protruding portions 16 that are alternately arranged in the longitudinal direction of the slit 7. The recessed portions 15 each have a surface curved so as to be recessed in the thickness direction of the upper wall portion 13 of the outer hollow portion 10, i.e., to allow an associated portion of the upper wall portion 13 to be thinner. The protruding portion 16 has an inverted V-shaped surface protruding in the thickness direction of the upper wall portion 13 of the outer hollow portion 10, i.e., to allow an associated portion of the upper wall portion 13 to be thicker. As illustrated in FIG. 10, the width of each recessed portion 15 (the dimension W1 thereof in the longitudinal direction of the slit 7) is set to be greater than the width of each protruding portion 16 (the dimension W2 thereof in the longitudinal direction of the slit 7).

The width W1 of the recessed portions 15 may be equal to or shorter than the width W2 of the protruding portions 16.

As illustrated in FIGS. 6 and 7, the unevenness continues from the edge of the slit 7 toward the inside of the hollow seal part 4 along the inner surface 13a of the upper wall portion 13 of the outer hollow portion 10. This increases the area having the unevenness.

Next, how the sealing member 1 configured as described above is formed will be described. First, the extruded portion 2 is obtained by extrusion, and a longitudinal end portion of the extruded portion 2 is then placed in the cavity of a mold die (not shown). While, in this state, a material in the cavity is molded in the mold die, the material in the mold die is integrated with the longitudinal end portion of the extruded portion 2. In this manner, the molded portion 3 can be integrated with the extruded portion 2.

To mold the molded portion 3, the outer and inner hollow portions 10 and 20 are formed with the core (not shown) of a mold die, and the core is then removed through the slit 7 while the molded portion 3 is elastically deformed. The shape of the core may define the inner surfaces of the outer and inner hollow portions 10 and 20. A portion of the core forming the slit 7 is a root portion of the core. This root portion is fixed to the mold die. The width of the slit 7 is much narrower than that of the outer or inner hollow portion 10 or 20 as illustrated in FIGS. 6 and 7. This reduces the thickness of the root portion of the core. In this embodiment, the slit 7 has the unevenness. This increases the thickness of portions of the root portion of the core used to form the recessed portions 15. Thus, the root portion of the core includes a plurality of ribs. This allows the core to be strong.

In particular, the unevenness continues from the edge of the slit 7 toward the inside of the hollow seal part 4 along the inner surface 13a of the upper wall portion 13 of the outer hollow portion 10. This increases the area having the unevenness. This may further improve the strength of the root portion of the core.

Furthermore, the width W1 of the recessed portions 15 is set to be greater than the width W2 of the protruding portions 16. This increases the area of portions of the root portion of the core that can have a greater thickness. This may also further improve the strength of the root portion of the core.

Next, the state of the sealing member 1 in use will be described. If the sealing member 1 is attached to the pillar 100, the tip ends of the protruding portions 16 in the direction of protrusion thereof come into contact with the inner surface (contact surface) 24a of the intermediate wall portion 24 forming part of the inner surface of the hollow seal part 4 as illustrated in FIG. 9. On the other hand, as illustrated in FIG. 8, the inner surfaces of the recessed portions 15 are apart from the inner surface 24a of the intermediate wall portion 24. In other words, the area of contact between the edge of the slit 7 and the inner surface 24a of the intermediate wall portion 24 is small.

If the front door 101 is in a closed state, the hollow seal part 4 is pressed by the periphery of the front door 101 and the pillar 100 of the vehicle body in the lateral direction of the vehicle, resulting in elastic deformation of the hollow seal part 4. In this case, the tip ends of the protruding portions 16 come into contact with the inner surface 24a of the intermediate wall portion 24, thereby generating a repulsive force. This may increase the sealing pressure at which the molded portion 3 is applied to substantially the same degree as in the situation where a bridge is provided. This allows the molded portion 3 and the extruded portion 2 to apply substantially the same sealing pressure.

The inner surface 24a of the intermediate wall portion 24 is configured as a flat surface that extends in the direction in which the unevenness continues. This may ensure that the tip ends of the protruding portions 16 in the direction of protrusion thereof come into contact with the inner surface 24a of the intermediate wall portion 24.

Opening the front door 101 causes the protruding portions 16 of the sealing member 1 to be apart from the inner surface of the hollow seal part 4, and closing the front door 101 causes the protruding portions 16 of the sealing member 1 to come into contact with the inner surface of the hollow seal part 4. In this case, the unevenness reduces the area of contact between the sealing member 1 and the inner surface of the hollow seal part 4. This makes it more difficult to make sticky sound from rubber or thermoplastic elastomer.

As can be seen from the foregoing description, the molded portion 3 of the vehicle sealing member 1 according to this embodiment has the slit 7 through which the core of the mold die for molding the inner surface of the hollow seal part 4 is removed. The edge of this slit 7 has the uneven contour. The protruding portions 16 are designed to come into contact with the inner surface of the hollow seal part 4. The provision of the protruding portions 16 allows the extruded portion 2 with the bridge 5 and the molded portion 3 with no bridge to apply substantially the same sealing pressure. The provision of the recessed portions 15 may increase the thickness of associated portions of the root portion of the core for molding the molded portion 3, and may increase the durability of the core.

The foregoing embodiment is merely an example in all aspects, and should not be restrictively interpreted. All the modifications and changes which come within the scope equivalent to the scope of the appended claims are within the scope of the present disclosure.

As can be seen from the foregoing description, a vehicle sealing member according to an embodiment of the present disclosure may be used while being disposed between the periphery of a vehicle door and the periphery of an associated door opening of a vehicle body.

What is claimed is:
1. A vehicle sealing member disposed between a periphery of a door and a periphery of an associated door opening of a vehicle body, the vehicle sealing member comprising:

a hollow seal part configured to seal a gap between the door and the door opening if pressed by the door in a closed state and the vehicle body, wherein:
- the vehicle sealing member includes an extruded portion and a molded portion that are integrated together,
- a bridge is provided in the extruded portion to extend such that a plurality of points of an inner surface of the hollow seal part are connected together,
- the molded portion has an opening portion through which a core of a mold die for molding the inner surface of the hollow seal part is removed,
- an edge of the opening portion has unevenness, and
- at least one protruding portion of the uneven edge comes into contact with the inner surface of the hollow seal part to seal the gap.

2. The vehicle sealing member of claim 1, wherein:
the opening portion of the molded portion is configured as a slit that extends in a longitudinal direction of the hollow seal part, and
an edge of the slit has the unevenness that continues in a longitudinal direction of the slit.

3. The vehicle sealing member of claim 1, wherein at least one recessed portion of the uneven edge is set to be wider than the at least one protruding portion.

4. The vehicle sealing member of claim 1, wherein a contact surface corresponding to a portion of the inner surface of the hollow seal part coming into contact with the at least one protruding portion is configured as a flat surface extending in a direction in which the unevenness continues.

5. The vehicle sealing member of claim 1, wherein the unevenness continues from the edge of the opening portion toward an inside of the hollow seal part.

* * * * *